Patented June 9, 1936

2,043,946

UNITED STATES PATENT OFFICE 2,043,946

METHOD OF DEHYDRATING CELLULOSE DERIVATIVES AND PRODUCTS THEREFROM

Franklin A. Bent and William Engs, Berkeley, Calif., assignors to Shell Development Company, San Francisco, Calif., a corporation of Delaware No Drawing. Application May 8, 1934, Serial No. 724,620

7 Claims. (Cl. 260—148)

Our invention relates to new and improved means for the removal of water from cellulose ethers, esters and mixed ether-esters whereby the aqueous content thereof is substantially reduced or eliminated, and wherein the displacing means "wets" the dehydrated product to an extent sufficient to render it less inflammable than the product per se, producing a finished product capable of safe storage, handling and/or transportation.

For illustrative purposes only, reference will be made to the treatment of nitrocellulose, although it will be understood that related materials such as cellulose xanthate, acetate, propionate, butyrate (whether mixed esters or not); ethyl, methyl, propyl, butyl, amyl, ethers of cellulose (whether iso or straight chain, or primary, secondary or tertiary in character), as well as their corresponding ether-esters, may be similarly treated.

In the present practice of nitrocellulose manufacture, after nitration of the cellulose, the excess acids used are removed by thorough washings with water. A comparatively thorough removal of this wash water must be effected to yield a salable product. The removal of this water by mechanical processes such as centrifuging or pressing has been found to be inadequate. These methods have been supplemented, heretofore, by the use of ethyl alcohol which, when percolated through the semi-dried mass, acts to displace the residual water.

It is well-known that nitrocellulose when in a dry condition is highly inflammable and unsafe to work or ship; but when its fibers are kept wetted with a suitable liquid it may be handled with relative safety. For this reason, it is customary to leave in the finished nitrocellulose some of the excess ethyl alcohol used for dehydration.

Because of its volatility and low flash point, ethyl alcohol has proven far from satisfactory as a wetting agent for nitrocellulose. Its replacement, after completion of the dehydrating process, by percolation with higher boiling compounds has been suggested. Such a procedure is objectionable because it adds another step to the operations.

It has been proposed that a less volatile, higher alcohol be substituted for the ethyl alcohol now generally employed. For this purpose normal butyl, isobutyl, secondary butyl, and primary amyl alcohols have been mentioned. All of these suffer, however, from the fact that they are very poor absorbers of water.

Now we have found that tertiary and/or unsaturated alcohols are particularly effective solvents for water as compared with their isomers. The increased solubility for water which results from the alcohol group being in the tertiary position is illustrated in the following table:

| Position of OH group | Approximate grams of $H_2O$ soluble in 100 cc. of alcohol at 20° C. | | |
|---|---|---|---|
| | Primary | Secondary | Tertiary |
| Butyl alcohol | 20.2 | 44.9 | Miscible in all proportions. |
| Amyl alcohol | 3.0 | 8.5 | 24 |

The advantages of an unsaturated linkage over the corresponding saturated form is shown by a comparison of methyl allyl alcohol, which dissolves about 74.3 grams of water in 100 cc. at 20° C., with butyl alcohol which dissolves but 15 grams under the same conditions. Those alcohols which contain both an unsaturated bond and a tertiary alcohol grouping, are consequently desirable solvents for water.

As a result of these findings, we have been able, in the dehydration of nitrocellulose, to combine the advantages of low volatility found in the higher alcohols, with the high solvent power for water formerly associated only with the lower boiling homologues.

We do not limit our invention to the above compounds specifically chosen as illustrations, but include all their homologues which dissolve water, as, for example, allyl alcohol, which is miscible in all proportions therewith, as well as their analogues, and the halogen and other substitution products of these alcohols. All of these compounds have the advantage of being non-solvents for nitrocellulose under the conditions of their application.

In the practice of our invention, any of the usual processes may be employed, for example, centrifuging, percolation and/or pressing. Moreover, these alcohols may be used in conjunction with other displacing agents as lower alcohols such as ethyl alcohol, either in admixture or following and replacing them for purposes of economy when applicants' reagents are relatively more expensive. Furthermore, any desired mixture of tertiary and/or unsaturated alcohols, which form the basis of our invention, may be used. However, we prefer the following process for the practical application of our invention.

The fibers of nitrocellulose, containing the final wash water are mechanically treated, as by pressing in the conventional machines designed for that operation. We prefer to use initially only a moderate pressure and thus remove only a part of the water. Tertiary butyl alcohol is then forced through the pressed cake by higher pressure until the residual water therein has been sufficiently displaced by the alcohol (as for example until the final water content is not over 1% of the weight of nitrocellulose). In ordinary practice, the amount of tertiary butyl alcohol required will depend to a large extent on the operating pressures employed. After the water content has been sufficiently reduced, the nitrocellulose, the fibers of which are thoroughly wetted with tertiary butyl alcohol, is ready for use, storage or shipment, the alcohol content being from 10 to 40% of the total weight of the product.

Tertiary amyl alcohol and/or methyl allyl alcohol, for further examples, may be applied in an analogous manner.

It is thus seen that our invention provides a commercially available method for safely dehydrating cellulose ethers, esters and mixed ether-esters and preparing a product therefrom which can be shipped and handled without danger, as well as stored for long periods under adverse conditions, as at high temperatures, without deterioration. These advantages are accomplished with substantial economies of effort and materials as compared with previous methods. Furthermore, considerable savings in operating time are possible through the use of our process for as a result of the use of alcohols highly miscible with water not only may more water be displaced by a given volume of the alcohol per unit of time of treatment, but also the same volume of water may be displaced in a shorter time. Moreover, the alcohols remaining in the finished product as permanent wetting agents, while without solvent action on cellulose ethers, esters and mixed ether-esters under the conditions used for their application, have valuable latent solvent power therefor which will be effective on solution of these compounds in an active solvent, as when they are used for lacquers, etc.

While we have in the foregoing described in some detail the preferred embodiment of our invention and some variants thereof, it will be understood that this is only for the purpose of making the invention more clear and that the invention is not to be regarded as limited to the details of operation described, nor is it dependent upon the soundness or accuracy of the theories which we have advanced as to the reasons for the advantageous results attained. On the other hand, the invention is to be regarded as limited only by the terms of the accompanying claims, in which it is our intention to claim all novelty inherent therein as broadly as is possible in view of the prior art.

We claim as our invention:

1. The method of dehydrating cellulose compounds of the class consisting of esters, ethers and ether-esters which comprises treating such a compound containing water with an alcohol selected from the group consisting of saturated aliphatic tertiary alcohols and unsaturated aliphatic alcohols capable of dissolving a substantial amount of water, which amount of water is materially greater than is capable of being removed by the analogous saturated aliphatic primary and secondary alcohols containing the same number of carbon atoms to the molecule.

2. The method of dehydrating cellulose compounds of the class consisting of esters, ethers and ether-esters which comprises treating such a compound containing water with an unsaturated aliphatic alcohol capable of dissolving a substantial amount of water, which amount of water is materially greater than is capable of being removed by the analogous saturated aliphatic primary and secondary alcohols containing the same number of carbon atoms to the molecule.

3. The method of dehydrating cellulose compounds of the class consisting of ethers, esters and ether-esters which comprises treating such a compound containing water with a saturated aliphatic tertiary alcohol capable of dissolving a substantial amount of water, which amount of water is materially greater than is capable of being removed by the analogous saturated aliphatic primary and secondary alcohols containing the same number of carbon atoms to the molecule.

4. The method of dehydrating nitrocellulose containing water which comprises passing therethrough an alcohol selected from the group consisting of saturated aliphatic tertiary alcohols and unsaturated aliphatic alcohols capable of dissolving a substantial amount of water, which amount of water is materially greater than is capable of being removed by the analogous saturated aliphatic primary and secondary alcohols containing the same number of carbon atoms to the molecule.

5. The method of dehydrating cellulose compounds of the class consisting of esters, ethers and ester-ethers, which comprises the steps of mechanically removing the excess water therefrom, passing therethrough a sufficient quantity of an alcohol selected from the group consisting of saturated aliphatic tertiary alcohols and unsaturated aliphatic alcohols capable of dissolving a substantial amount of water to absorb substantially all of the remaining water, and removing the excess of said alcohol, which amount of water is materially greater than is capable of being removed by the analogous saturated aliphatic primary and secondary alcohols containing the same number of carbon atoms to the molecule.

6. Cellulose compounds of the class consisting of esters, ethers and ether-esters, wet with an alcohol of the group consisting of saturated aliphatic tertiary alcohols and unsaturated aliphatic alcohols capable of dissolving a substantial amount of water, which amount of water is materially greater than is capable of being removed by the analogous saturated aliphatic primary and secondary alcohols containing the same number of carbon atoms to the molecule.

7. The method of treating nitrocellulose containing water which comprises removing a part of the water from the mass of wet nitrocellulose, percolating an excess of an alcohol selected from the group consisting of saturated aliphatic tertiary alcohols and unsaturated aliphatic alcohols capable of dissolving a substantial amount of water, which amount of water is materially greater than is capable of being removed by the analogous saturated aliphatic primary and secondary alcohols containing the same number of carbon atoms to the molecule through the damp mass for the displacement of residual water, and reducing the alcohol content of the mass to within the range of from about 10% to about 40%.

FRANKLIN A. BENT.
WILLIAM ENGS.